Dec. 13, 1938.   M. T. ZAROTSCHENZEFF   2,140,043
FREEZING WITH FRUIT JUICES
Filed Nov. 14, 1936
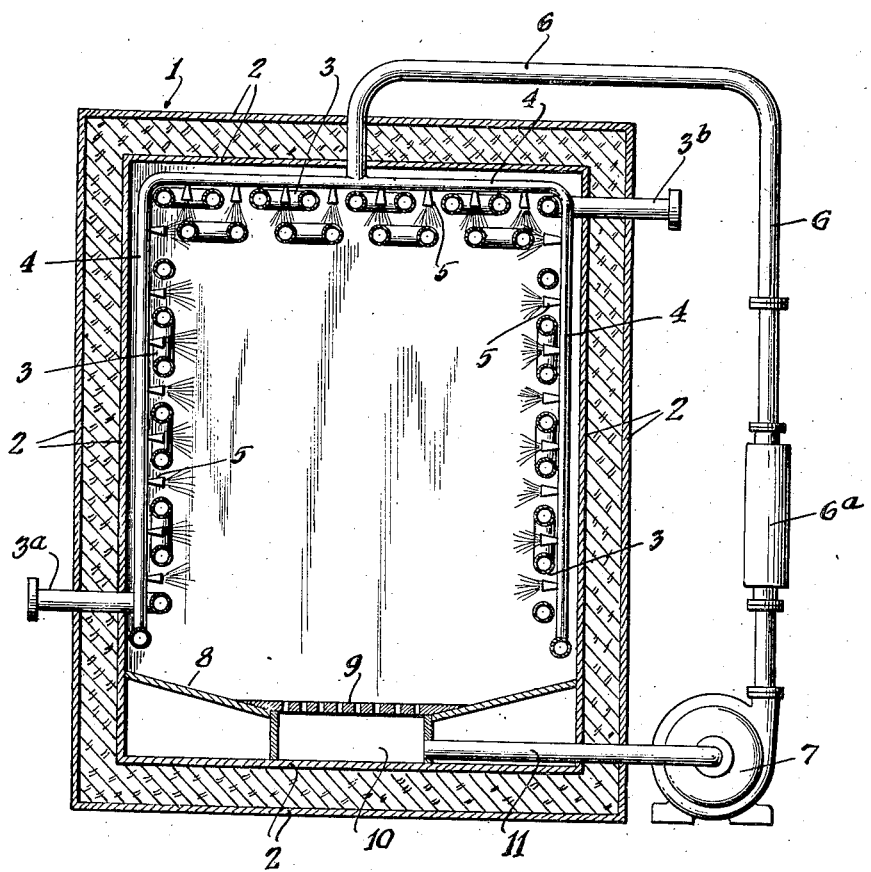
INVENTOR
Mikail T. Zarotschenzeff
BY
Hoguet, Neary & Campbell
HIS ATTORNEYS Patented Dec. 13, 1938

2,140,043

UNITED STATES PATENT OFFICE 2,140,043

FREEZING WITH FRUIT JUICES

Mikail T. Zarotschenzeff, New York, N. Y., assignor to Z Pack Corporation, a corporation of Delaware Application November 14, 1936, Serial No. 110,786

2 Claims. (Cl. 99—198)

My invention relates broadly to the freezing of fruits, berries, vegetables and other edible products with natural or neutral refrigerated liquids and more particularly to the freezing of such products with sugar syrups or juices of the respective products.

The freezing of fruits and vegetables according to a well known procedure is effected by treatment with cold air. This method presents several serious disadvantages. For example, the product freezes rather slowly with the formation of large destructive crystals; drying and parching of the surface often occurs; the color changes and the edible qualities of the product depreciate materially.

Freezing of certain fruits, such as strawberries, in dry sugar has also been attempted but with unfavorable results. The dry sugar absorbs substantial amounts of the natural juices in the fruit leaving it deficient in this respect and therefore of inferior quality.

Another prior art process for freezing foods involves the use of salt brine. This process has definite inherent limitations since the brine is considered objectionable if not injurious to the edible qualities of the food and therefore special precautions are taken to minimize direct contact of the brine with the refrigerated product. Also, food refrigerated with brine must be thoroughly washed before consumption to insure removal of the brine.

In accordance with the improved method of my invention utilizing refrigerated liquids as the freezing agent, the above disadvantages are minimized, especially with regard to maintaining the natural edible qualities of the product. The neutral refrigerating liquids, such as sugar syrups, that I use are protective and not in any manner injurious to the natural desired properties of the product being refrigerated. They become a part of the edible product and do not have to be removed. The quick freezing with liquids, such as sugar syrups, produces a liquid coating over the product effecting homogeneous freezing throughout the fruit or other product and without causing any drying or shrinking. The liquid coating does not harden normally since its freezing or solidification point is below 32° F. The coating may become crystalline or glass-like if the previously frozen product is placed in cold storage for a considerable length of time.

One of the features of my invention is the use of natural or artificial juices, corresponding to the product to be frozen, as the refrigerating agent.

An object of my invention is to provide improved frozen edible products and processes for their manufacture, utilizing liquids as the refrigerating agent.

Another and more specific object of my invention is to freeze fruits and vegetables with a refrigerated liquid such as sugar syrup or juices obtained from or corresponding to the natural products.

The novel features of my invention are set forth with particularity in the appended claims. The inventive processes and products, however, will be clearly understood from a consideration of the following description taken in conjunction with the accompanying drawing, in which the single figure represents diagrammatically appropriate equipment for performing the freezing operations.

One of the principal ideas of my present invention is to freeze fruits, vegetables, etc. in a natural or neutral medium, such that the frozen product will not be affected adversely in any manner and upon thawing will reappear in substantially the same form as the original fruit before freezing. In other words, the fruit after being frozen and thawed will retain its original appearance, bloom, and other qualities.

The natural or neutral medium, which I employ in my freezing process, may consist of any syrup or liquid that will not contaminate the food being frozen and which has a sufficiently low freezing point, i. e., below 32° F. These syrups or other liquids may be prepared, of course, in any desirable combination. For example, sugar syrup may be made of solid sugar and water mixed in such proportions as to give the desired consistency to the syrup; or sugar syrup may be obtained commercially and diluted with water. Also, a mixture of sugar with glucose and other sugar derivatives may be used.

While my process is adaptable broadly to the use of various liquids, syrups or sugar solutions that are practically inert to the product being frozen, I have found it advantageous in several instances to use the natural juices of the product being frozen as the freezing agent or medium. For example, when freezing strawberries, the freezing liquid would be strawberry juice, and in the case of cherries, cherry juice would be used. By using the natural juices from these fruits as a refrigerating medium, the frozen fruit cannot have its flavor or taste adversely affected.

I have also found it advantageous when using fruit juices as a refrigerating medium to add to such juices a substance that will lower the freezing point of the juices. For example, I may employ sugar, alcohol, glycerine, or other such suitable agents which are known to have the property of lowering the freezing point of liquids. The purpose of lowering the freezing point of the refrigerating medium is to enable the product to be frozen without actual freezing, i. e., solidification of the refrigerating medium. For example, sugar syrup lowers the freezing point from about 32° F. to 15° F. It is due to this temperature difference that I am able to freeze fruits, etc., whose freezing point is within the range of 29° F. to 31° F.

The amount of the material added to lower the freezing point will vary for different fruits and vegetables, and therefore the amounts of the sugar, alcohol, glycerine, etc. to be added to the refrigerating medium should be determined separately according to the specific product being frozen. As an illustrative example, when freezing strawberries with refrigerated strawberry juice, I use approximately 50% sugar and 50% fruit juice, by weight. This amount or proportion is so regulated as to obtain the lowest possible temperature for the refrigerating medium without freezing it solid.

In the case of certain fruits and vegetables, it will no doubt be impractical to prepare a juice extract as the refrigerating medium, and in such cases I propose to use a liquid or mixture of liquids which has the greatest resemblance possible to the natural juice; in other words, to approach as nearly as possible the characteristics of the juice contained in the product being frozen.

As a specific example of an application of my invention using fruit juices as a refrigerating medium, I may use the excess of the juice normally obtained from pineapple and by adding one of the above mentioned substances for lowering the freezing point of the juice I apply this refrigerating medium, at a temperature substantially below the natural freezing point, directly to the slices of the fresh pineapple. According to this example, as well as various other modifications of my process, there will result an equilibrium between the juices contained in the fruit and juices used as the refrigerating medium. In other words, no osmosis action, i. e., filtration of the fruit juices in or out of the fruit, will take place, since the osmotic pressure of the fruit juice within the product and the refrigerating fruit juice on the surface of the product is equal. This is true, of course, only when the juice in the product and the refrigerating juice are the same. Because of this equilibrium condition, the original juice in the fruit will not be extracted by the refrigerating medium as is done when certain other types of refrigerating media are employed, such as dry sugar.

One of the practical merits of my process is that it provides for using the excess of the juice always available in production, and instead of extracting any of the natural juices in the product it actually increases the amount of such juices.

While it is to be understood that the process of my invention may be carried out with various forms of apparatus, reference is made to the accompanying drawing as illustrating one convenient form of the equipment that may be satisfactorily used for freezing of fruits, vegetables, etc. in accordance with my invention. Referring now to this drawing, the equipment is shown to consist of primarily a container 1, which may assume any convenient form and which is preferably closed at the top and bottom and on all sides by insulated walls 2. This container is provided with a series of refrigerated pipes 3, having an inlet 3a and an outlet 3b, for maintaining a low temperature in the container. There is also provided a series of pipes 4 having nozzles 5 through which the refrigerating medium, whether it be a sugar syrup, fruit juice or the like, is sprayed upon the fruit, vegetable, or other product to be frozen. The pipes 4 and nozzles 5 are supplied through pipe 6 with the refrigerating medium contained in a storage tank 6. A force pump 7 is provided for forcing the refrigerating medium from the storage tank 6a through the pipes 4 and nozzles 5.

The product to be refrigerated is placed at any convenient location in the container so that it is more or less surrounded by the spraying nozzles 5 and will be thoroughly covered by the refrigerating medium emitted from these nozzles. Preferably the product should be positioned in such a manner as to permit free drainage of the refrigerating liquid.

The container 1 has a slanting floor 8, a perforated plate 9, and a receptacle 10 so as to provide a flow of the excess or waste refrigerating medium from the container through pipe 11 and thence through the force pump 7 by means of which this refrigerating liquid is recirculated throughout the system as above described.

Instead of spraying the product to be frozen, it may, of course, be dipped, brushed, or otherwise covered with the refrigerating liquid provided the latter completely covers the product and thereby prevents it from any deterioration as long as it is desired to maintain the product in a frozen condition. In the usual case the frozen product is only partially impregnated with the refrigerating liquid, although with certain products such as cherries from which the stones have been removed the refrigerating liquid penetrates the broken skin and substantially complete impregnation results.

The word "sugars" as used in the specification and claims herein is intended to cover any and all types of sugars commonly known as "sweet carbohydrates". These include, for example, cane sugar, maple sugar, glucose, fructose, lactose, maltose, etc.

It is to be understood that my invention is not limited to the specific products, treating materials, and apparatus described hereinabove, but is susceptible to various modifications and changes. The appended claims are intended to cover some of the principal novel features of the frozen product and its process of manufacture.

What I claim is:

1. A method for refrigerating edible products comprising spraying the products in their natural state with a refrigerated solution consisting of sugar and juice of said product that freezes the product without affecting adversely any of the natural properties of said product.

2. A method of refrigerating edible products comprising spraying the products in their natural state with a refrigerated liquid consisting of the juice of said product and a freezing point depressant normally present in the juices, said liquid effecting freezing of the product without affecting adversely any of the natural properties of said product.

MIKAIL T. ZAROTSCHENZEFF.